(12) United States Patent
Mammel

(10) Patent No.: US 6,760,997 B1
(45) Date of Patent: Jul. 13, 2004

(54) NO-TIE FISHING SYSTEM AND METHOD

(76) Inventor: Allen Dean Mammel, 4642 N. Versailles, Dallas, TX (US) 75209

(*) Notice: Subject to any disclaimer, the term of this patent is extended or adjusted under 35 U.S.C. 154(b) by 0 days.

(21) Appl. No.: 09/398,987

(22) Filed: Sep. 17, 1999

Related U.S. Application Data

(63) Continuation-in-part of application No. 09/129,106, filed on Aug. 4, 1998, now Pat. No. 5,970,650.
(60) Provisional application No. 60/111,305, filed on Dec. 7, 1998.

(51) Int. Cl.[7] .......................... A01K 91/04; A01K 83/00
(52) U.S. Cl. ........................... 43/44.83; 43/43.16
(58) Field of Search ............................ 43/42.44, 44.83, 43/44.84, 44.85, 44.98; 289/1.2, 1.5

(56) References Cited

U.S. PATENT DOCUMENTS

| | | | |
|---|---|---|---|
| 86,154 A | 1/1869 | Hiltz | |
| 103,645 A | 5/1870 | Muscroft | |
| 319,655 A | 6/1885 | Wright | |
| 6,339 A | 5/1892 | Haviland | 125/27 |
| 26,131 A | 11/1903 | Allcock | 235/1 B |
| 745,066 A | 11/1903 | Koch | |
| 805,284 A | 11/1905 | Greenway et al. | |
| 1,532,534 A | 4/1925 | Hewitt | |
| 1,713,041 A | 5/1929 | Fey | 43/44.86 |
| 1,961,378 A | 6/1934 | Mitchell | 43/40 |
| 2,056,506 A | 10/1936 | Dopp | |
| 2,060,499 A | 11/1936 | Heidrich | 43/28 |
| 2,138,702 A | 11/1938 | Litsey | 43/28 |
| 2,184,187 A | 12/1939 | Hildebrandt | 43/28 |
| 2,218,946 A | 10/1940 | Barnett | 43/28 |
| 2,315,307 A | 3/1943 | Wilson | 43/27 |
| 2,501,210 A | 3/1950 | Cretin | 43/43.16 |
| 2,533,418 A | 12/1950 | Benoit | 43/44.83 |
| 2,577,466 A | 12/1951 | Jones | 154/118 |
| 2,672,704 A * | 3/1954 | Smith | 43/43.1 |
| 2,674,824 A | 4/1954 | Werner | 43/44.83 |
| 2,700,843 A | 2/1955 | Werner | 43/44.82 |
| 2,732,652 A | 1/1956 | Parks | 43/44.83 |
| 2,747,320 A | 5/1956 | Boland | 43/44.98 |
| 2,766,549 A | 10/1956 | Dickerson | 43/44.98 |
| 2,835,069 A | 5/1958 | Flye, Sr. | 43/44.84 |
| 2,847,220 A | 8/1958 | Heffron et al. | 43/44.83 |
| 2,898,701 A | 8/1959 | Stinson | 43/44.6 |
| 2,962,834 A | 12/1960 | Stinson | 43/44.6 |
| 3,778,871 A | 12/1973 | Ratte, Jr. | 24/236 |
| 3,831,309 A | 8/1974 | Martuch | 43/44.98 |
| 3,832,309 A | 8/1974 | Martuch | 43/44.98 |
| 3,857,645 A | 12/1974 | Klein | 403/206 |
| 3,878,637 A | 4/1975 | Flower | 43/44.83 |
| 3,936,971 A | 2/1976 | McGahee | 43/44.83 |

(List continued on next page.)

FOREIGN PATENT DOCUMENTS

| | | | |
|---|---|---|---|
| CA | 1163804 | 3/1984 | 43/44.83 |
| DE | 1014372 | 8/1957 | 43/43.16 |
| DE | 2106151 | 8/1971 | 43/43.16 |
| FR | 964991 | 8/1950 | 43/44.85 |

(List continued on next page.)

OTHER PUBLICATIONS

The Ashley Book of Knots, Ashley, 1944, pp. 48–57, 204.*
The Uni–Knot, The FisherNet, Woolbert, 1996.*

(List continued on next page.)

*Primary Examiner*—Kurt Rowan
(74) *Attorney, Agent, or Firm*—Baker Botts L.L.P.

(57) ABSTRACT

A no-tie fishing system is provided with a fish attractor having an open eye with a blocker. The eye of the fish attractor is disposed at an end of a shank. The eye includes a distal end disposed adjacent to and spaced from the shank. The fishing system also includes a fishing line having a first end with a sliding loop formed thereon. The sliding loop may be releasably engaged with the eye of the fish attractor. The fishing line may have a second end with a fixed loop formed thereon for releasable engagement with other portions of the fishing system.

5 Claims, 4 Drawing Sheets

U.S. PATENT DOCUMENTS

| | | | | |
|---|---|---|---|---|
| 4,008,912 A | * | 2/1977 | Kotov | 289/1.2 |
| 4,219,956 A | | 9/1980 | Hedman | 43/42.1 |
| 4,251,942 A | | 2/1981 | Jacobus | 43/44.8 |
| 4,336,087 A | | 6/1982 | Martuch et al. | 156/85 |
| 4,503,634 A | | 3/1985 | Hamayasu | |
| 4,535,562 A | | 8/1985 | Fry | 43/44.95 |
| 4,604,821 A | | 8/1986 | Moser | 43/44.98 |
| 4,621,449 A | | 11/1986 | Nakagawa | |
| 4,773,181 A | | 9/1988 | Radden | 43/42.37 |
| 4,777,759 A | | 10/1988 | Wulff | 43/42.25 |
| 4,819,366 A | | 4/1989 | Manno | 43/44.81 |
| 4,905,403 A | | 3/1990 | Manno | 43/43.16 |
| 5,024,020 A | | 6/1991 | Sitton | 43/43.16 |
| 5,105,575 A | | 4/1992 | Robertaccio | 43/44.8 |
| 5,113,616 A | | 5/1992 | McManus | 43/44.83 |
| 5,129,177 A | | 7/1992 | Haigh et al. | 43/44.83 |
| 5,197,217 A | | 3/1993 | Browning | 43/4 |
| 5,237,772 A | | 8/1993 | Gibbs | 43/44.8 |
| 5,241,776 A | | 9/1993 | Adams | 43/44.92 |
| 5,279,067 A | | 1/1994 | Tollison | 43/44.83 |
| 5,469,652 A | | 11/1995 | Drosdak | 43/44.83 |
| 5,524,385 A | | 6/1996 | Longo | 43/44.83 |
| 5,638,633 A | | 6/1997 | Hoffman, Jr. | 43/44.83 |
| 5,711,105 A | | 1/1998 | Schreifels et al. | 43/44.98 |
| 5,718,077 A | | 2/1998 | Meinel | 43/44.98 |
| 5,893,592 A | * | 4/1999 | Schulze | 289/1.2 |
| 5,970,650 A | | 10/1999 | Mammel | 43/44.83 |

FOREIGN PATENT DOCUMENTS

| | | | | |
|---|---|---|---|---|
| FR | 989859 | 9/1951 | | |
| FR | 2 490 927 | 4/1982 | | A01K/91/06 |
| GB | 8560 | 3/1890 | | 43/42.49 |
| GB | 19600 | 10/1901 | | 43/44.83 |
| GB | 202923 | 8/1923 | | 43/42.25 |
| GB | 930517 | 7/1963 | | 43/44.83 |
| GB | 1013480 | 12/1965 | | 43/42.25 |
| GB | 413 | 2/1966 | | 43/44.83 |
| GB | 1242666 | 8/1971 | | |
| GB | 2030032 | 4/1980 | | 43/44.83 |
| GB | 2067882 | 8/1981 | | A01K/83/06 |
| GB | 2214043 | 2/1992 | | A01K/91/04 |
| GB | 2304513 | 3/1997 | | |
| JP | 40/6022668 | 2/1994 | | 43/43.16 |
| NO | 72467 | 8/1947 | | |

OTHER PUBLICATIONS

Presenting the Fly, Lefty Kreh, The George Harvey Knot, 1999.*

International Search Report for PCT/US99/28391, Apr. 6, 2000.

Loop 'N Lock Fly Fishing System, 4 page instruction brochure, printed by Dean Mammel, Jan., 1999.

Orvis Fishing and Outdoor 1998, pp. 52–53, www.orvis.com.

PCT Internation Search Report; Mar. 11, 1999.

Kaufmann's Streamborn Inc.—1999 Edition—29th Year; pp. 82–83.

Flyfishing Magazine—Jun., 1998 Issue.

Flyfishing Magazine—May–Jun., 1998 Issue; p. 44.

http://tiemco.co.jp/english/products/fly_prod/tmc/tmce-hook.htm.

* cited by examiner

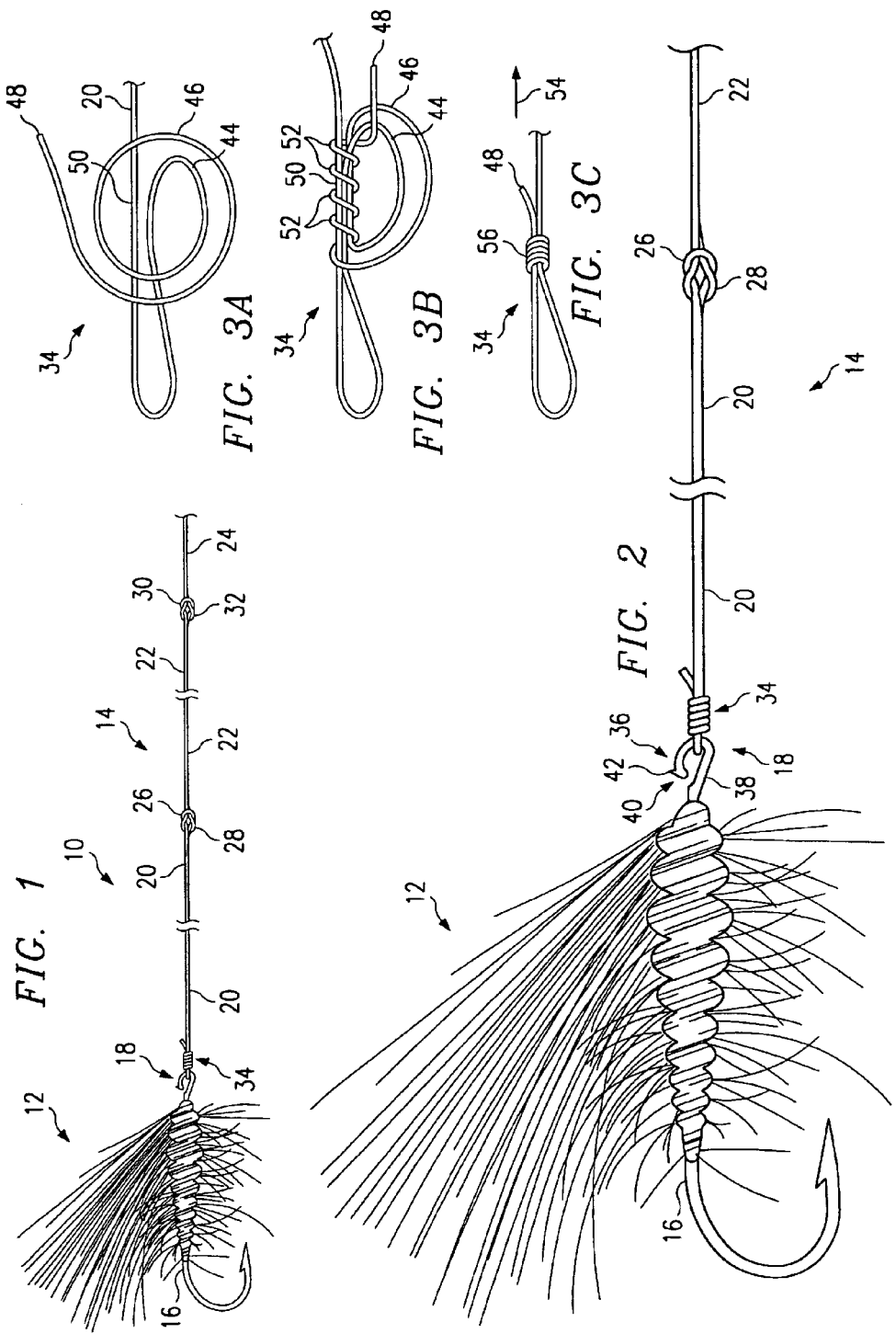

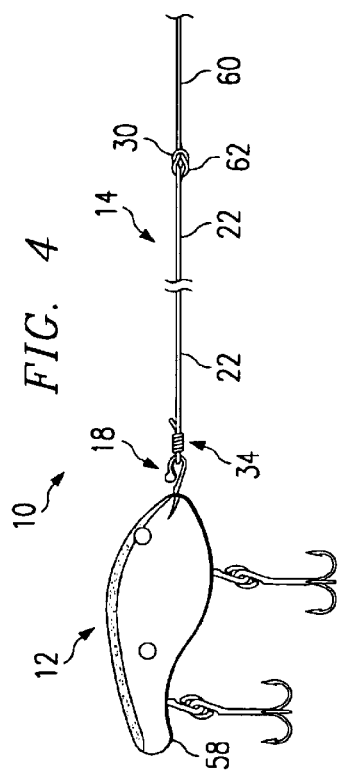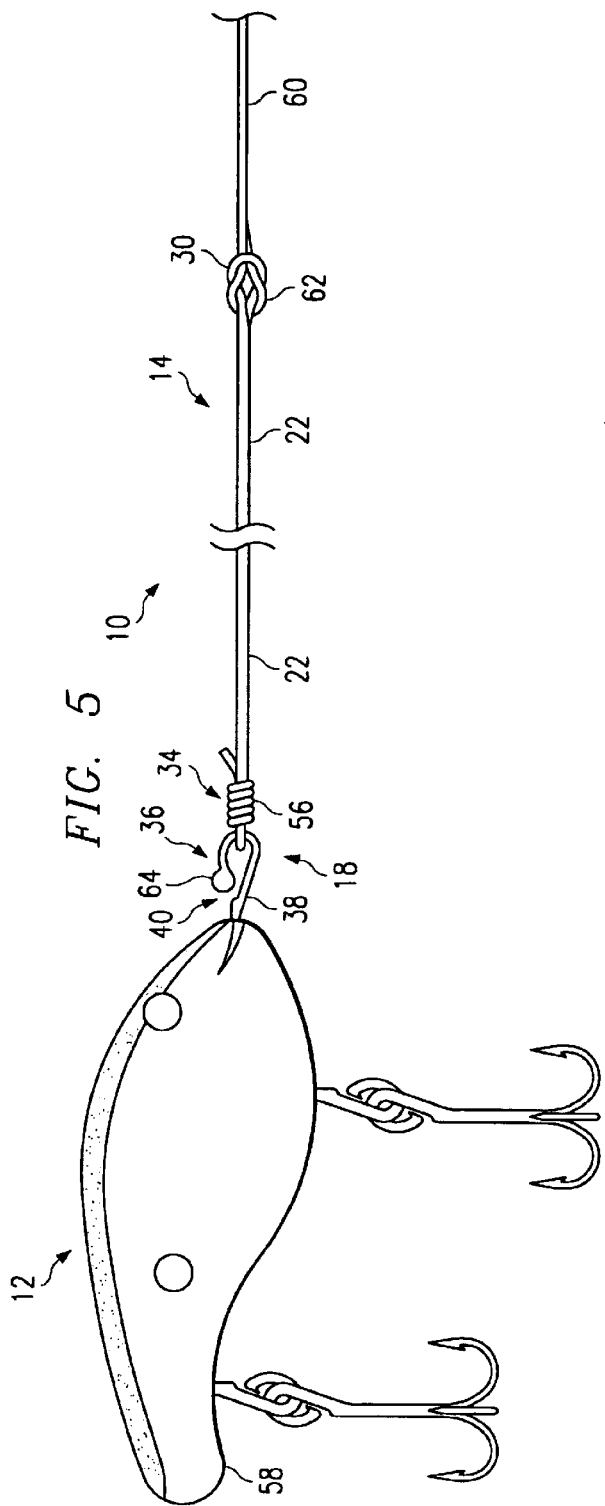

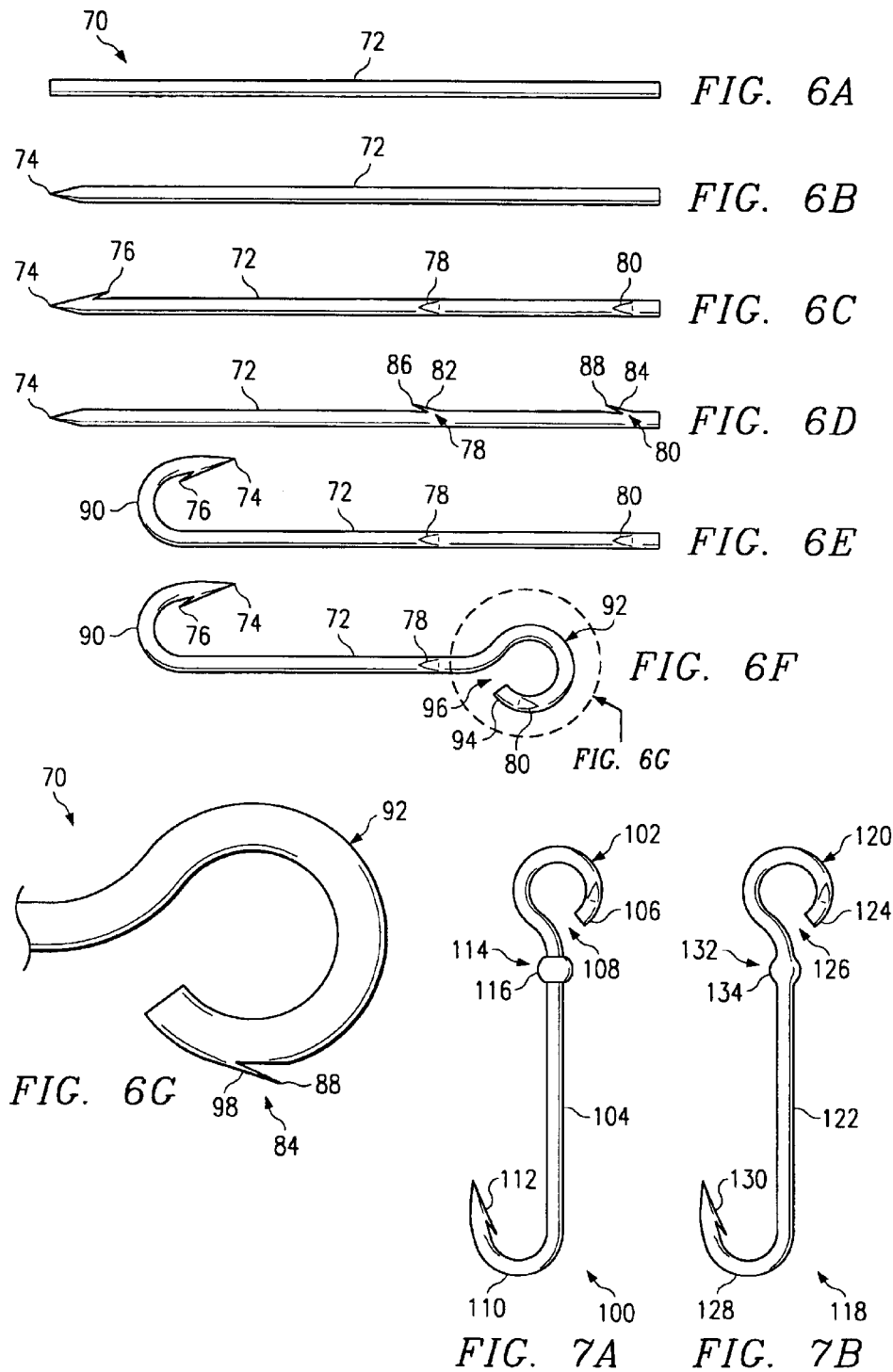

NO-TIE FISHING SYSTEM AND METHOD

RELATED APPLICATIONS

This application claims the benefit of Ser. No. 60/111,305, entitled No-Tie Fishing System and Method, filed provisionally on Dec. 7, 1998. This application is also a continuation-in-part application of application Ser. No. 09/129,106 filed Aug. 4, 1998, entitled No-Thread Fishing Equipment now U.S. Pat. No. 5,970,650.

TECHNICAL FIELD OF THE INVENTION

This invention relates in general to fishing equipment and, more particularly, to a no-tie fishing system and method.

BACKGROUND OF THE INVENTION

Fishing equipment is available in a variety of sizes, shapes, colors and configurations for attracting and catching different species of fish. Examples of fishing equipment include devices for hooking and catching the fish, such as fishing lures or fish attractors, and fishing line for casting and retrieving the fish attractors. Several examples of fish attractors include spinner baits, jigs, plastic worms, fish hooks for attaching colorful or scented materials, fishing flies, and the like. Several examples of fishing line include monofilament line, leaders, tapered leaders, tippets, fly line, and the like.

Fishing equipment is generally designed and constructed for attracting and catching a specific species of fish. For example, fishing flies are generally constructed to resemble any one of a variety of species of insect that a particular species of fish feeds upon. Accordingly, some types of fishing equipment are generally very small. For example, a size 18 fish hook for a fishing fly measures approximately seven millimeters in length. Additionally, fish attractors generally include an eye for attaching the fishing line so that the fish attractor can be cast and retrieved. To maintain the appearance and attractability of the fish attractor, the eye is also generally constructed very small and in proportion to the size of the fish attractor.

However, connecting various types of fishing line material together and connecting the fishing line to the fish attractor can be cumbersome and time consuming. For example, since some types of fish attractors are generally constructed very small, threading and tying fishing line to the eye of the fish attractor becomes extremely difficult. With average or below average eyesight; poor lighting conditions; inclement weather; wind; a necessity to change the fish attractor quickly, such as during the limited minutes of a hatch; or stiff, cold, wet, large, or arthritic hands; the difficulty and problem of threading and tying the fishing line to the eye of the fish attractor is greatly magnified.

Additionally, the size of the eye of the fish attractor generally determines the size of fishing line that may be used with the fish attractor. The smaller eyes of the fish attractors generally require smaller fishing line. Consequently, the fishing line becomes smaller in diameter, more limp, more difficult to see, and increasingly difficult to handle. For example, a size 18 fishing fly is approximately seven millimeters in length, has a fish hook eye outside diameter of approximately 0.75 millimeters, a fish hook eye inside diameter of approximately 0.30 millimeters, and will generally accommodate fishing line through the eye of the fish hook of approximately 0.13 millimeters or less. Thus, the flexibility of using a variety of sizes of fish attractor devices with different diameter fishing line is limited.

Further, interchanging fish attractors may require time consuming and cumbersome replacement of various sections of the fishing line. For example, leaders used in fly fishing may include several joined sections of line decreasing in diameter from the fly line to the fishing fly or tippet. When interchanging fishing flies, various portions of the fishing line are generally cut off and may require adding sections to the leader, replacement of the leader, replacement of the tippet, or replacement of both the leader and the tippet. Thus, the flexibility of interchanging fish attractors is generally limited.

SUMMARY OF THE INVENTION

Accordingly, a need has arisen for an improved fishing system and method that provides greater ease and flexibility of use. The present invention provides no-tie fishing equipment and method that addresses shortcomings of prior fishing equipment and related methods of using such equipment.

According to one embodiment of the present invention, a no-tie fishing system includes a fish attractor having an eye. The eye includes a generally circular configuration and is disposed at an end of a shank. The eye also includes a distal end disposed adjacent to and permanently spaced from the shank. The system also includes a fishing line having a first end. A sliding loop is formed at the first end of the fishing line for releasably engaging the fishing line with the eye of the fish attractor. A permanently formed gap is disposed between the distal end of the eye and the shank. The gap is sized to allow the fishing line to slide therethrough.

According to another embodiment of the present invention, a method for fabricating no-tie fishing equipment for a fishing device includes providing a fishing line having a first end. The method also includes forming a sliding loop on the first end of the fishing line for releasably engaging the fishing line with the fishing device.

According to another embodiment of the present invention, a method for forming a no-thread fishing apparatus includes forming a point on a first end of a shank and forming a barb on the first end of the shank adjacent the point. The method also includes forming the first end of the shank into a hook and forming an eye having a generally circular configuration on the second end of the shank. The eye includes a distal end disposed adjacent to and permanently spaced from the shank thereby forming a permanent gap between the distal end of the eye and the shank. The gap is sized to allow a fishing line to slide therethrough. The method also includes forming a first blocker on the second end of the shank. The first blocker is positioned to prevent a fishing line coupled to the eye from sliding off the eye. The method further includes forming a second blocker on the shank. The second blocker is disposed between the hook and the first blocker. The second blocker is positioned to prevent an attractor attached to the shank from obstructing the gap.

The present invention provides several technical advantages. In one embodiment of the present invention, the no-tie fishing system allows easier attachment of fishing line than other fishing equipment. For example, a sliding loop may be formed on one end of the fishing line and releasably engaged with the eye of a fish attractor. Combining a sliding loop with an eye incorporating teachings of the present invention substantially eliminates threading fishing line through the eye of a fish attractor and tying the fishing line to the eye of the fish attractor.

A no-tie fishing system incorporating teachings of the present invention provides greater flexibility than prior fishing systems by allowing increased use of smaller fish attractors with larger diameter fishing line. For example, smaller fish attractors generally include smaller diameter eyes. A sliding loop formed on one end of the larger diameter fishing line may be releasably engaged with the eye of the smaller fish attractor. Combining a sliding loop with an eye incorporating teachings of the present invention substantially eliminates threading the larger diameter fishing line through the generally smaller diameter eye of the small fish attractor.

Additionally, a no-tie fishing system incorporating teachings of the present invention allows easier interchangeability of fishing devices than other fishing systems by color coding a fish attractor and/or a fishing line. For example, color codes may be added to a leader, a tippet, and/or a fish attractor to designate the leader, tippet and/or fish attractor for use in particular fishing applications. The leader, tippet, and/or fish attractor may be easily interchanged with a new leader, tippet, and/or fish attractor for use in a different fishing application using the color codes.

A no-tie fishing system incorporating the teachings of the present invention also provides greater efficiency than other fishing systems. For example, combining a sliding loop with an eye incorporating teachings of the present invention substantially reduces loss of fishing line resulting from removing portions of the fishing line when interchanging fish attractors.

Other technical advantages will be readily apparent to one skilled in the art from the following figures, descriptions, and claims.

BRIEF DESCRIPTION OF THE DRAWINGS

For a complete understanding of the present invention, and the advantages thereof, reference is now made to the following descriptions taken in conjunction with the accompanying drawings, in which:

FIG. 1 is a schematic drawing in elevation showing a no-tie fishing system constructed in accordance with teachings of the present invention;

FIG. 2 is an enlarged view of a portion of the no-tie fishing system shown in FIG. 1;

FIGS. 3A through 3C are enlarged elevational views illustrating a method for constructing a sliding loop for a no-tie fishing system constructed in accordance with teachings of the present invention;

FIG. 4 is a schematic drawing in elevation illustrating an alternate embodiment of a no-tie fishing system constructed in accordance with teachings of the present invention;

FIG. 5 is an enlarged view of a portion of the no-tie fishing system shown in FIG. 4;

FIGS. 6A through 6G are enlarged elevational views illustrating a method for constructing a no-tie fishing apparatus in accordance with the teachings of the present invention;

FIGS. 7A and 7B are enlarged elevational views illustrating alternate embodiments of a no-tie fishing apparatus in accordance with the teachings of the present invention.

DETAILED DESCRIPTION OF THE INVENTION

Figure 8A:
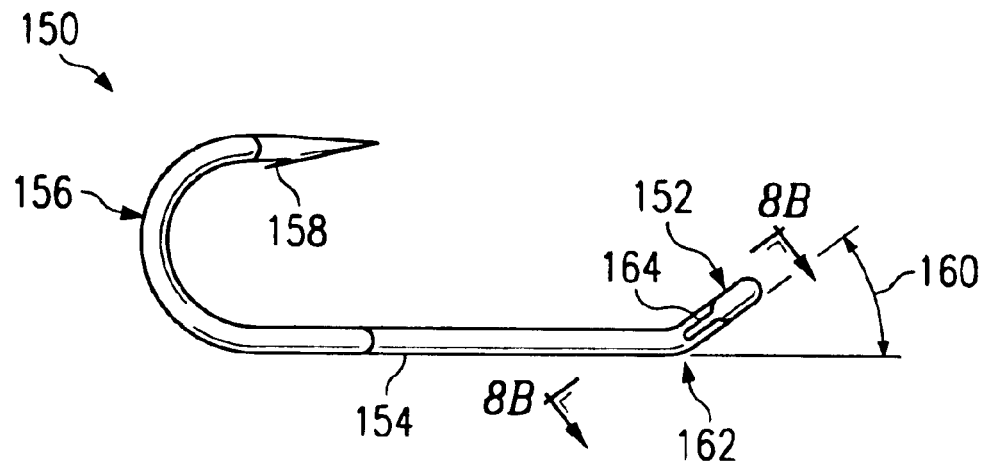
FIGS. 8A and 8B are enlarged elevational views illustrating an alternate embodiment of a no-tie fishing apparatus in accordance with the teachings of the present invention.

Embodiments of the present invention and its advantages are best understood by referring to FIGS. 1 through 8B of the drawings, like numerals being used for like and corresponding parts of the various drawings.

FIG. 1 is an elevational view illustrating one embodiment of a no-tie fishing system 10 constructed in accordance with teachings of the present invention. Fishing system 10 includes fish attractor 12 and fishing line 14 attached to fish attractor 12. In the illustrated embodiment, fish attractor 12 may be generally described as a fishing fly. However, other suitable types and configurations of fish attractors 12 may be used, such as spinner baits, jigs, plastic worms, fish hooks, and the like (not explicitly shown).

Fish attractor 12 of fishing system 10 includes hook 16 having eye 18 for attaching fishing line 14 to fish attractor 12 so that fish attractor 12 can be cast and retrieved. In the illustrated embodiment, fishing line 14 includes tippet 20, leader 22, and fly line 24. However, fishing line 14 may include other suitable types and arrangements of fishing devices and materials for releasable engagement with fish attractor 12. For example, fish attractor 12 may be attached directly to leader 22 or fly line 24 (not explicitly shown).

In the embodiment illustrated in FIG. 1, tippet 20 is preferably coupled to leader 22 by joining fixed loop 26 formed at one end of tippet 20 with fixed loop 28 formed at one end of leader 22. Additionally, leader 22 may be coupled to fly line 24 by joining fixed loop 30 formed at another end of leader 22 with fixed loop 32 formed at one end of fly line 24. For example, fixed loops 26 and 28 and fixed loops 30 and 32 may be respectively coupled using a handshake method of attachment as illustrated in FIG. 1. However, other suitable methods or devices may be used for attaching sections of fishing line 14 together. As will be described in greater detail in conjunction with FIGS. 2 and 3, fishing line 14 is preferably releasably engaged with fish attractor 12 using a sliding loop 34.

FIG. 2 is an enlarged view illustrating a portion of fishing system 10. In the illustrated embodiment, eye 18 of hook 16 provides a location for attaching fishing line 14 to fish attractor 12 so that fish attractor 12 can be cast and retrieved. Eye 18 includes distal end 36 disposed adjacent shank 38 and spaced from shank 38. Eye 18 of fish attractor 12 also includes blocker 40 for preventing sliding loop 34 of fishing line 14 attached to eye 18 from sliding off eye 18. In the illustrated embodiment, blocker 40 includes barb 42 projecting outwardly from distal end 36 for preventing sliding loop 34 attached to eye 18 from sliding off eye 18. However, blocker 40 may be constructed having other suitable shapes or configurations for preventing sliding loop 34 from sliding off eye 18. For example, blocker 40 may project inward or outward with respect to distal end 36.

Fishing line 14 may be attached to fish attractor 12 using sliding loop 34. In the embodiment illustrated in FIG. 2, sliding loop 34 is formed at one end of tippet 20. In operation, eye 18 of fish attractor 12, having distal end 36 spaced from shank 38, allows sliding loop 34 to be releasably engaged with eye 18. Sliding loop 34 may be tightened or clinched to eye 18, thereby securing tippet 20 to fish attractor 12. Sliding loop 34 may be loosened to allow removing fish attractor 12 and attaching another fish attractor to fishing line 14. A silicon coating or other suitable lubricant may be applied to portions of fishing line 14 to provide easier engagement and disengagement of sliding loop 34 with eye 18. Thus, fishing system 10 provides for easier attachment and removal of fish attractors from fishing line 14 than prior fishing systems by alleviating a requirement of threading and tying tippet 20 to each fish attractor.

Additionally, fishing system 10 provides greater flexibility than prior fishing systems by allowing fish attractor 12 to be used with an increased variety of sizes of fishing line 14. For example, larger diameter fishing line 14 may be releasably engaged with eye 18 using sliding loop 34, thereby alleviating a requirement of threading and tying the larger diameter fishing line 14 onto eye 18 of fish attractor 12.

FIGS. 3A, 3B and 3C are enlarged elevational views illustrating one method for fabricating a sliding loop 34 for use with a fishing system incorporating teachings of the present invention. Referring to FIG. 3A, loops 44 and 46 are formed using free end 48 of tippet 20. Loops 44 and 46 are positioned adjacent one another and adjacent central portion 50 of tippet 20.

Referring to FIG. 3B, free end 48 of tippet 20 is looped over central portion 50 of tippet 20 and through loops 44 and 46. Free end 48 is then wrapped around central portion 50 and through loops 44 and 46 several times to form a plurality of loops 52 around central portion 50 and loops 44 and 46. In the illustrated embodiment, free end 48 is wrapped around central portion 50 and through loops 44 and 46 four times. However, free end 48 may be wrapped around central portion 50 and through loops 44 and 46 any number of times to produce sliding loop 34.

Referring to FIG. 3C, a force is applied to free end 48 of tippet 20 in the direction indicated by arrow 54, thereby drawing free end 48 of tippet 20 away from loops 44, 46 and 52. The applied force to free end 48 of tippet 20 causes loops 44, 46 and 52 to be drawn together to form a sliding loop knot 56. Sliding loop knot 56 allows sliding loop 34 to be increased or decreased in diameter for releasable engagement of sliding-loop 34 with eye 18 of fish attractor 12.

In operation, sliding loop 34 may be placed over distal end 36 of eye 18 of fish attractor 12. A force is applied to sliding loop knot 56 to move sliding loop knot 56 toward eye 18 of fish attractor 12, thereby causing sliding loop 34 to decrease in diameter. As sliding loop 34 decreases in diameter, sliding loop 34 becomes tightened or clinched against eye 18 of fish attractor 12, thereby securing fishing line 14 to fish attractor 12. Blocker 40 of eye 18 prevents sliding loop 34 from disengaging from eye 18.

Additionally, fishing line 14 may be readily detached from fish attractor 12 by reversing the above-described operation. For example, a force may be applied to sliding loop knot 56 to move sliding loop knot 56 away from eye 18 of fish attractor 12, thereby causing sliding loop .34 to increase in diameter. As sliding loop 34 increases in diameter, sliding loop 34 may be readily moved over blocker 40 and removed from eye 18 of fish attractor 12.

Thus, fishing system 10 provides greater flexibility than prior fishing systems by providing for easier engagement and disengagement of fishing line 14 and fish attractor 12. Additionally, fishing system 10 provides greater flexibility than prior fishing systems by allowing increased use of smaller fish attractors 12 with larger diameter fishing line 14. For example, distal end 36 of eye 18 may be disposed adjacent shank 38 and spaced from shank 38 various distances to accommodate a variety of diameters of fishing line 14. Sliding loop 34 of fishing line 14 may be easily placed onto eye 18 of fish attractor 12 and secured using sliding loop knot 56.

Fishing system 10 may also be color coded to provide for easier interchangeability of fish attractor 12 and fishing line 14. For example, a specific type of fish attractor 12 may be designed and constructed for generally lightweight fishing applications. Accordingly, the lightweight fish attractor 12 may require a corresponding lightweight fishing line 14 or fishing line 14 having a particular length or diameter. For example, a lightweight fish attractor 12 may require a particular length or diameter of tippet 20 for attaching to lightweight fish attractor 12. Eye 18 of lightweight fish attractor 12 may be color coded to designate that lightweight fish attractor 12 requires a particular length or diameter of tippet 20.

Fishing line 14 may also be color coded to designate fishing line 14 for a particular fishing application. Referring to FIG. 1, for example, fishing line 14 may be color coded by color coding sliding loop 34, fixed loops 26 and 28, and fixed loops 30 and 32 of fishing line 14. Thus, for example, a specific type, diameter or length of tippet 20 may be easily replaced with another type, diameter or length of tippet 20 to accommodate a particular fishing application by selecting tippet 20 using the color codes of sliding loop 34 and/or fixed loop 26 of tippet 20.

For example, interchanging fish attractor 12 may require a different diameter tippet 20. Instead of adding or removing sections to leader 22 to accommodate the different diameter tippet 20, leader 22 may be easily replaced by selecting a new leader 22 using the color codes of fixed loops 28 and 30 of the new leader 22. For example, the new leader 22 may be selected by correlating the color codes of fixed loops 28 and 30 with the color codes of fixed loop 26 of tippet 20 and fixed loop 32 of fly line 24. Therefore, fishing system 10 provides for easier interchangeability than prior fishing systems by color coding fish attractor 12, fishing line 14, or both fish attractor 12 and fishing line 14.

For some applications, such as nymph fishing with a fishing fly type of fish attractor 12, color coding of fixed loops 26 and/or 28 may be used to indicate fish strikes with fish attractor 12. For example, color coding of fixed loops 26 and/or 28 may indicate movement of fish attractor 12 resulting from fish strikes on fish attractor 12.

Additionally, fishing system 10 provides greater flexibility than prior fishing systems by providing for easier interchangeability of fishing line 14 and fish attractor 12. For example, sliding loop 34 of fishing line 14 alleviates the requirement of detaching or cutting off a section of fishing line 14 for attaching fishing line 14 to a new fish attractor 12. Referring to FIG. 1, for example, sliding loop 34 of tippet 20 may be easily removed from eye 18 of fish attractor 12 by applying a force to sliding loop knot 54 away from eye 18 and removing sliding loop 34 from eye 18. Sliding loop 34 of tippet 20 may then be easily placed onto eye 18 of a new fish attractor 12, thereby alleviating a requirement of detaching or cutting off a section of tippet 20 for attaching to the eye 18 of the new fish attractor 12. Therefore, fishing system 10 provides for greater flexibility than prior fishing systems by providing easier interchangeability of fish attractor 12 and fishing line 14.

FIG. 4 is a schematic drawing in elevation showing an alternate embodiment of fishing system 10 constructed in accordance with teachings of the present invention. In the illustrated embodiment, fish attractor 12 may be generally described as a fishing lure. Additionally, in the illustrated embodiment, fishing line 14 includes leader 22 and line 60. As previously described, leader 22 may be coupled to line 60 by joining fixed loop 30 formed at one end of leader 22 with fixed loop 62 formed at one end of line 60. Fixed loops 30 and 62 may be joined by using a handshake method of attachment as illustrated in FIG. 4. However, other suitable methods or materials may be used for attaching sections of fishing line 14 together. As will be described in greater detail in conjunction with FIG. 5, fishing line 14 is preferably releasably engaged with fish attractor 12 using sliding loop 34.

FIG. 5 is an enlarged view of a portion of fishing system 10. In the illustrated embodiment, fish attractor 12 also includes eye 18 having distal end 34 disposed adjacent shank 38 and spaced from shank 38. Shank 38 is attached to body 58 of fish attractor 12 by threading or screwing shank 38 into body 58 of fish attractor 12. However, other suitable methods or materials may be used to attach shank 38 to body 58 of fish attractor 12. Eye 18 of fish attractor 12 also includes blocker 40 for preventing sliding loop 34 from disengaging from eye 18 of fish attractor 12. In the illustrated embodiment, blocker 40 includes protrusion 64 projecting outwardly from distal end 36. However, other suitable shapes or configurations of blocker 40 may be used to prevent sliding loop 34 from disengaging from eye 18 of fish attractor 12. For example, blocker 40 may project inward or outward with respect to distal end 36.

Fishing line 14 may be attached to fish attractor 12 using sliding loop 34. In the embodiment illustrated in FIG. 5, sliding loop 34 is formed at one end of leader 22. In operation, leader 22 of fishing line 14 is releasably engaged with eye 18 of fish attractor 12 using sliding loop 34. For example, in the illustrated embodiment, sliding loop 34 is placed over protrusion 64 and onto eye 18 of fishing lure 58. A force is applied to sliding loop knot 56 toward eye 18 causing sliding loop 34 to decrease in diameter. As sliding loop 34 decreases in diameter, sliding loop 34 becomes tightened or clinched against eye 18 of fish attractor 12, thereby releasably engaging leader 22 of fishing line 14 with eye 18 of fish attractor 12.

Additionally, as previously described, fishing line 14 may be readily detached from fish attractor 12 by reversing the above-described operation. For example, a force may be applied to sliding loop knot 56 to move sliding loop knot 56 away from eye 18 of fish attractor 12, thereby causing sliding loop 34 to increase in diameter. As sliding loop 34 increases in diameter, sliding loop 34 may be readily moved over protrusion 64 and removed from eye 18 of fish attractor 12.

Therefore, the present invention provides for increased flexibility by providing easier and quicker interchangeability of fishing devices. For example, a variety of fishing devices, such as fish hooks, jigs, fishing flies, swivels, and the like, may be used with a variety of fishing line 14 configurations to accommodate a variety of fishing applications. Additionally, the present invention provides greater flexibility by allowing increased diameter fishing line 14 to be used with a variety of fishing devices.

FIGS. 6A–6G are enlarged elevational views illustrating a method for constructing a no-tie fishing hook 70 in accordance with the teachings of the present invention. FIG. 6A illustrates a shank 72 for forming no-tie fishing hook 70. No-tie fishing hook 70 may be constructed using steel or other suitable materials for shank 72. Additionally, a variety of diameters of shank 72 may be used to construct no-tie fishing hook 70. For example, no-tie fishing hook 70 may be constructed from shank 72 having a small diameter to accommodate decreased bend radii in subsequent forming operations of shank 72, decreased weight of no-tie fishing hook 70, and decreased visibility during fishing conditions.

In FIG. 6B, a point 74 is formed at one end of shank 72. A barb 76 is formed at one end of shank 72 adjacent point 74 as illustrated in FIG. 6C. Barb 76 may be used to prevent an attractor attached to no-tie fishing hook 70 from sliding off no-tie fishing hook 70. Additionally, barb 76 may be used to prevent a fish that has been hooked with no-tie fishing hook 70 from releasing no-tie fishing hook 70.

No-tie fishing hook 70 also includes blockers 78 and 80 formed on shank 72 as illustrated in FIG. 6C. Blocker 78 may be formed on shank 72 to limit the movement of an attractor attached to shank 72. As will be described in greater detail in conjunction with FIG. 6F, blocker 78 may also be formed on shank 72 to prevent an attractor attached to shank 72 from obstructing a gap formed between a distal end of an eye and shank 72. Blocker 80 may be formed on an end of shank 72 opposite point 74 to prevent a fishing line attached to no-tie fishing hook 70 from sliding off no-tie fishing hook 70. For example, as will be described in greater detail in conjunction with FIG. 6F, blocker 80 may be formed to prevent a fishing line engaged with an eye of no-tie fishing hook 70 from sliding off the eye.

FIG. 6D is a side view of no-tie fishing hook 70 illustrated in FIG. 6C taken along the line 6D—6D of FIG. 6C. As illustrated in FIG. 6D, blockers 78 and 80 may include barbs 82 and 84, respectively. For example, barb 82 may be formed having a point 86 directed along shank 72 and toward point 74, thereby preventing an attractor attached to shank 72 from migrating along shank 72 beyond barb 82. Barb 84 may be formed having a point 88 directed along shank 72 and toward point 74. Thus, as will be described in greater detail in conjunction with FIG. 6F, as an eye is formed at the end of shank 72 having barb 84, barb 84 may be positioned to prevent a fishing line attached to the eye from sliding off the eye.

FIG. 6E illustrates a side view of no-tie fishing hook 70 illustrated in FIG. 6D taken along the line 6E—6E of FIG. 6D. As illustrated in FIG. 6E, a hook 90 is formed at an end of shank 72 containing point 72. Additionally, as illustrated in FIGS. 6D and 6E, barbs 82 and 84 may be formed in a plane approximately ninety degrees from a plane of hook 90 to prevent damage or deformation to barbs 82 and 84 during formation of hook 90. However, barbs 82 and 84 may also be formed at other suitable angles about shank 72 with respect to the plane of hook 90.

In FIG. 6F, an eye 92 having a generally circular configuration is formed at an end of shank 72 opposite hook 90. Eye 92 includes a distal end 94 disposed adjacent to and permanently spaced apart from shank 72, thereby forming a permanent gap 96 between distal end 94 of eye 92 and shank 72. Gap 96 may be sized to allow a fishing line to slide through gap 96 to an interior portion of eye 92. For example, gap 96 may be sized having a width measured between shank 72 and distal end 94 of approximately one half a diameter of shank 72. Further, for example, gap 96 may be sized having a width of approximately two times a diameter of a fishing line. Thus, gap 96 may be sized having a variety of sizes to accommodate various fishing requirements and conditions.

As illustrated in FIG. 6F, eye 92 may be formed in a plane substantially parallel to the plane of hook 90 to prevent damage or deformation to barbs 82 and 84 during formation of eye 92. However, eye 92 may also be formed in other suitable planes with respect to the plane of hook 90. Additionally, eye 92 may be formed having a variety of sizes to accommodate various fishing requirements and conditions. For example, eye 92 may be formed having an interior diameter approximately two times a diameter of shank 72. Thus, eye 92 may be formed having a small size while allowing easy engagement and disengagement of a fishing line to eye 92.

As illustrated in FIG. 6F, blocker 80 is positioned on shank 72 such that after forming eye 92, blocker 80 is positioned to prevent a fishing line attached to eye 92 from sliding off distal end 94 of eye 92. For example, blocker 80 may include barb 84 having point 88 directed away from distal end 94 of eye 92. Thus, in operation, sliding loop 34 may be placed into gap 96, over distal end 94 and past barb 84 to releasably engage eye 92 at a portion of eye 92 between barb 84 and blocker 78. Thus, barb 84 may be positioned to prevent sliding loop 34 from sliding off distal end 94 of eye 92. Additionally, blocker 78 may be positioned along shank 72 to prevent an attractor attached to shank 72 from obstructing gap 96. For example, blocker 78 may be positioned on shank 72 below gap 96 toward hook 90 such that blocker 78 prevents migration of the attractor along shank 72 towards eye 92. Therefore, blocker 78 may be positioned to limit the movement of the attractor along shank 72. Therefore, gap 96 may remain unobstructed for easy engagement and disengagement of a fishing line with eye 92.

FIG. 6G illustrates an example method of forming a barb on no-tie fishing hook 70. In this example, barb 84 is formed in a plane substantially parallel to the plane of eye 92. However, the example method described below may be applied to forming barbs at other suitable locations and orientations on no-tie fishing hook 70. As illustrated in FIG. 6G; barb 84 may be formed by nicking or slicing a surface of shank 72 to cause a portion 98 of shank 72 to partially separate from shank 72. Portion 98 may be manipulated outwardly away from shank 72 to form barb 84. The above-described method of forming barb 84 may also be used to form barbs 76 and 82 of no-tie fishing hook 70. However, other suitable methods may also be used to form barbs 82, 84 and 76.

FIG. 7A is an enlarged elevational view illustrating an alternate embodiment of a no-tie fishing hook 100 in accordance with the teaching of the present invention. In this example, no-tie fishing hook 100 includes an eye 102 having a generally circular configuration disposed at one end of a shank 104. Eye 102 includes a distal end 106 disposed adjacent to and permanently spaced from shank 104, thereby forming a permanent gap 108 disposed between distal end 106 of eye 102 and shank 104. Gap 108 may be sized to allow a fishing line to slide through gap 108 and into an interior area of eye 102. For example, sliding loop 34 may be slid through gap 108 and over distal end 106 to releasably engage eye 102.

No-tie fishing hook 100 also includes a hook 110 having a barb 112 formed at an end of shank 104 opposite eye 102. No-tie fishing hook 100 also includes a blocker 114 disposed on shank 104. Blocker 114 may be positioned on shank 104 to prevent an attractor attached to shank 104 from obstructing gap 108. For example, an attractor may be attached to shank 104 at hook 110 and extend along shank 104 toward blocker 114. Blocker 114 may be used to prevent the attractor from migrating upwardly along shank 104 toward gap 108. Therefore, blocker 114 may be positioned to prevent gap 108 from becoming obstructed, thereby providing easier engagement and disengagement of a fishing line to eye 102.

In the embodiment illustrated in FIG. 7A, blocker 114 includes a wrapping medium 116, such as thread, plastic, or other suitable materials. Wrapping medium 116 may be wrapped around shank 104 as required to prevent gap 108 from becoming obstructed. Wrapping medium 116 may also include an elastic material that may be stretched and slid onto no-tie fishing hook 100 and slid along shank 104 to a desired position to prevent obstruction of gap 108.

FIG. 7B is an enlarged elevational view illustrating an alternate embodiment of a no-tie fishing hook 118 in accordance with the teachings of the present invention. No-tie fishing hook 118 includes an eye 120 having a generally circular configuration disposed at one end of a shank 122. Eye 120 includes a distal end 124 disposed adjacent to and permanently spaced from shank 122, thereby forming a permanent gap 126 disposed between distal end 124 of eye 120 and shank 122. Gap 126 may be sized to allow a fishing line to slide through gap 126 and into an interior area of eye 120.

No-tie fishing hook 118 also includes a hook 128 having a barb 130 formed at an end of shank 122 opposite eye 120. No-tie fishing hook 118 also includes a blocker 132 to prevent an attractor attached to shank 122 from obstructing gap 126. In this example, blocker 132 includes a protrusion 134 formed on shank 122. Protrusion 134 may be sized to prevent a variety of sizes of attractors from migrating upwardly along shank 122 toward eye 120 from obstructing gap 126. Blocker 132 may also include other suitable shapes and configurations to prevent attractors attached to shank 122 from obstructing gap 126.

FIG. 8A is an enlarged elevational view illustrating an alternate embodiment of a no-tie fishing hook 150 in accordance with the teachings of the present. In this example, no-tie fishing hook 150 includes an eye 152 disposed at one end of a shank 154. No-tie fishing hook 150 also includes a hook 156 having a barb 158 formed at an end of shank 154 opposite eye 152. In this example, eye 152 is formed at an angle 160 such that eye 152 is directed inwardly toward hook 156. However, eye 152 may also be formed at other suitable angles and orientations. Eye 152 also includes a blocker 162 to prevent a fishing line attached to eye 152 from sliding off of eye 152. In this example, blocker 162 is formed by squeezing or-flattening a distal end 164 of eye 152.

Figure 8B:
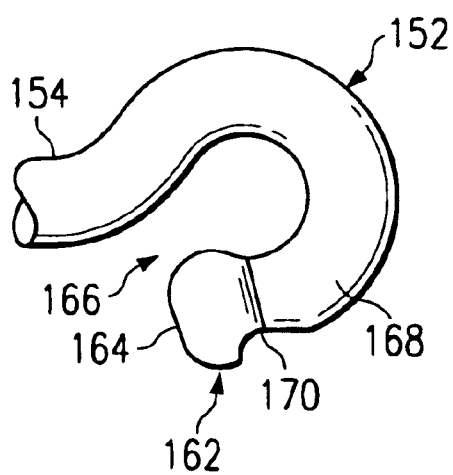

FIG. 8B is an enlarged side view of eye 152 illustrated in FIG. 8A taken along the line 8B—8B of FIG. 8A. As illustrated in FIG. 8B, eye 152 includes distal end 164 disposed adjacent to and permanently spaced apart from shank 154, thereby forming a permanent gap 166 between distal end 164 of eye 152 and shank 154. Gap 166 may be sized to allow a fishing line to slide through gap 166 to an interior portion of eye 152. Thus, gap 166 may be sized to accommodate a variety of fishing line sizes to meet various fishing requirements and conditions.

As described above, blocker 162 may be formed by squeezing or flattening distal end 164 of eye 152, thereby increasing a width of distal end 164 relative to a width of an adjacent portion 168 of eye 152. Eye 152 also includes an accurately formed portion 170 between distal end 164 and adjacent portion 168 of eye 152 to provide a smooth transition from blocker 162 to adjacent portion 168. In operation, sliding loop 34 may be slid through gap 166 and over blocker 162 to releasably engage eye 152. Sliding loop 134 may then be tightened or clenched against eye 152. Thus, blocker 162 prevents sliding loop 34 from disengaging eye 152.

Although the present invention and its advantages have been described in detail, it should be understood that various changes, substitutions, and alterations, can be made therein without departing from the spirit and scope of the present invention as defined by the appended claims.

What is claimed is:

1. A fish hook and a fishing line comprising:
   a shank;
   a hook disposed at a first end of the shank;
   an eye disposed at a second end of the shank;

the eye having a distal end disposed adjacent to and permanently spaced a selected distance from the shank to allow a portion of the fishing line to slide into the eye;

the fishing line having a diameter;

the distance between the distal end of the eye and the shank at least equal to approximately twice the diameter of the fishing line;

a blocker disposed on and forming an integral part of the eye to prevent the portion of the fishing line from sliding off the eye;

a sliding loop formed on a first end of the fishing line by a sliding loop knot;

the sliding loop providing the portion of the line which slides into the eye;

the sliding loop having a diameter which may be decreased by movement of a sliding loop knot to releasably engage the fishing line with the eye by clenching the sliding loop against the eye and which may be released by movement of the sliding loop knot to allow movement of the sliding loop over the blocker and disengagement of the sliding loop from the eye;

the sliding loop knot operable for movement along a central portion of the fishing line to allow engaging and disengaging the sliding loop from the eye of the fish hook;

the fishing line having a first section defined in part by the sliding loop formed on the first end and a second end;

the fishing line having a second section defined in part by a respective first end and a respective second end; and the second end of the first section releasably engaged with the first end of the second section.

2. A fish hook and a fishing line comprising:

a shank;

a hook disposed at a first end of the shank;

an eye having a generally circular configuration disposed at a second end of the shank;

the eye having a distal end disposed adjacent to and permanently spaced a selected distance from the shank to allow a portion of the fishing line to slide into the eye;

the fishing line having a diameter;

the distance between the distal end of the eye and the shank at least equal to approximately twice the diameter of the fishing line;

a blocker disposed on and forming an integral part of the eye to prevent the portion of the fishing line from sliding off the eye;

the distal end of the eye, the eye and the shank disposed in approximately the same plane;

a sliding loop formed on a first end of the fishing line by a sliding loop knot;

the sliding loop providing the portion of the line which slides into the eye;

the sliding loop having a diameter which may be decreased by movement of a sliding loop knot to releasably engage the fishing line with the eye by clenching the sliding loop against the eye and which may be released by movement of the sliding loop knot to allow movement of the sliding loop over the blocker and disengagement of the sliding loop from the eye;

the sliding loop knot operable for movement along a central portion of the fishing line to allow engaging and disengaging the sliding loop from the eye of the fish hook;

the fishing line having a first section defined in part by the sliding loop formed on the first end and a second end;

the fishing line having a second section defined in part by a respective first end and a respective second end; and the second end of the first section releasably engaged with the first end of the second section.

3. A fish hook and a fishing line comprising:

the fishing line having a first diameter;

a shank having a second diameter;

a hook disposed at a first end of the shank;

an eye disposed at a second end of the shank;

the eye having a distal end disposed adjacent to and permanently spaced a selected distance from the shank to allow a portion of the fishing line to slide into the eye;

the distance between the distal end of the eye and the shank equal to at least twice the diameter of the fishing line;

a blocker disposed on and forming an integral part of the eye to prevent the portion of the fishing line from sliding off the eye;

a sliding loop formed on a first end of the fishing line by a sliding loop knot;

the sliding loop providing the portion of the line which slides into the eye;

the sliding loop having a diameter which may be decreased by movement of a sliding loop knot to releasably engage the fishing line with the eye by clenching the sliding loop against the eye and which may be released by movement of the sliding loop knot to allow movement of a sliding loop over the blocker and disengagement of the sliding loop from the eye;

the sliding loop knot operable for movement along a central portion of the fishing line to allow engaging and disengaging the sliding loop from the eye of the fish hook;

the fishing line having a first section defined in part by the sliding loop formed on the first end and a second end;

the fishing line having a second section defined in part by a respective first end and a respective second end;

the second end of the first section releasably engaged with the first end of the second section;

a first fixed loop formed on the second end of the first section;

a second fixed loop formed on the first end of the second section; and the first fixed loop and the second fixed loop releasably engaged with each other.

4. A fish hook and a fishing line comprising:

the fishing line having a first diameter;

a shank having a second diameter;

a hook disposed at a first end of the shank;

an eye having a generally circular configuration disposed at a second end of the shank;

the eye having a diameter approximately equal to twice the diameter of the shank;

the eye having a distal end disposed adjacent to and permanently spaced a selected distance from the shank to allow a portion of the fishing line to slide into the eye;

the distance between the distal end of the eye and the shank equal to approximately twice the diameter of the shank;

a blocker disposed on and forming an integral part of the eye to prevent the portion of the fishing line from sliding off the eye;

the distal end of the eye, the eye and the shank disposed in approximately the same plane;

a sliding loop formed on a first end of the fishing line by a sliding loop knot;

the sliding loop providing the portion of the line which slides into the eye;

the sliding loop having a diameter which may be decreased by movement of a sliding loop knot to releasably engage the fishing line with the eye by clenching the sliding loop against the eye and which may be released by movement of the sliding loop knot to allow movement of a sliding loop over the blocker and disengagement of the sliding loop from the eye;

the sliding loop knot operable for movement along a central portion of the fishing line to allow engaging and disengaging the sliding loop from the eye of the fish hook;

the fishing line having a first section defined in part by the sliding loop formed on the first end and a second end;

the fishing line having a second section defined in part by a respective first end and a respective second end;

the second end of the first section releasably engaged with the first end of the second section;

a first fixed loop formed on the second end of the first section;

a second fixed loop formed on the first end of the second section; and the first fixed loop and the second fixed loop releasably engaged with each other.

5. A fish hook and a fishing line comprising:

a shank;

a hook disposed at a first end of the shank;

an eye disposed at a second end of the shank;

the eye having a distal end disposed adjacent to and permanently spaced a selected distance from the shank to allow a portion of the fishing line to slide into the eye;

a blocker disposed on and forming an integral part of the eye to prevent the portion of the fishing line from sliding off the eye;

the distal end of the eye, the eye and the shank disposed in approximately the same plane;

a sliding loop formed on a first end of the fishing line by a sliding loop knot;

the sliding loop providing the portion of the line which slides into the eye;

the sliding loop having a diameter which may be decreased by movement of a sliding loop knot to releasably engage the fishing line with the eye by clenching the sliding loop against the eye and which may be released by movement of the sliding loop knot to allow movement of a sliding loop over the blocker and disengagement of the sliding loop from the eye;

the sliding loop knot operable for movement along a central portion of the fishing line to allow engaging and disengaging the sliding loop from the eye of the fish hook;

the fishing line having a first section defined in part by the sliding loop formed on the first end and a second end;

the fishing line having a second section defined in part by a respective first end and a respective second end;

the second end of the first section releasably engaged with the first end of the second section;

a first fixed loop formed on the second end of the first section;

a second fixed loop formed on the first end of the second section; and the first loop and the second fixed loop releasably engaged with each other.

* * * * *